United States Patent [19]

Ferguson

[11] 4,127,980
[45] Dec. 5, 1978

[54] CROSSFLOW MOWER WITH AUTOMATIC BRAKE/SHARPENER

[76] Inventor: Hugo S. Ferguson, c/o Duffers Associates, Inc., Box 85, R.D. 5, Troy, N.Y. 12180

[21] Appl. No.: 820,226

[22] Filed: Jul. 29, 1977

Related U.S. Application Data

[63] Continuation-in-part of Ser. No. 741,132, Nov. 11, 1976.

[51] Int. Cl.² .................. A01D 69/08; A01D 75/08
[52] U.S. Cl. .................................. 56/11.3; 51/250; 56/11.8; 56/250
[58] Field of Search ............ 56/11.3, 11.6, 11.7, 56/11.8, 250; 192/11; 51/250; 76/82.1

[56] References Cited

U.S. PATENT DOCUMENTS

| | | | |
|---|---|---|---|
| 2,076,311 | 4/1937 | White | 56/250 |
| 2,399,437 | 4/1946 | Herbert | 56/250 |
| 2,478,080 | 8/1949 | Bente | 56/250 |
| 2,600,892 | 6/1952 | Madsen | 56/250 |
| 3,677,316 | 7/1972 | Markham | 51/250 |

Primary Examiner—Jay N. Eskovitz
Attorney, Agent, or Firm—Pennie & Edmonds

[57] ABSTRACT

A mower of the cross-flow blower type has clutch means for engaging the motor with the rotor and disengaging the motor therefrom. One wall section of the blower conduit has an abrasive panel facing the rotor and is mounted for movement between a moving position in which the abrasive panel is spaced from the rotor and a brake/sharpening position in which the panel is contacted by the rotor blades. Means are provided for automatically moving the abrasive panel to the brake/sharpening position when the clutch means is disengaged and to the mowing position when the clutch means is engaged. Advantageously the abrasive panel is on a portion of the upper wall section which is close to the rotor and forms the front vortex breaker of the blower conduit. The wall section carrying the abrasive panel may be pivotally mounted or, advantageously, resiliently attached to the adjacent portion of the blower conduit. An eccentric rod may be employed for moving the wall section and abrasive panel.

6 Claims, 7 Drawing Figures

CROSSFLOW MOWER WITH AUTOMATIC BRAKE/SHARPENER

REFERENCE TO OTHER APPLICATIONS

This application is a continuation-in-part of U.S. application Ser. No. 741,132 filed Nov. 11, 1976.

BACKGROUND OF THE INVENTION

The present invention relates to mowers of the cross-flow blower type and provides an automatic brake/sharpener for such mowers.

Mowers of the cross-flow blower type are described in my U.S. Pat. No. 3,673,773 and comprise a cylindrical reel having a plurality of spaced blades horizontally mounted on a carriage with the reel axis extending laterally of the carriage. A blower conduit cooperates with the reel to form a blower of the cross-flow or transverse-flow type. The outer leading edges of the blades are sharp to form cutting edges. No bed knife or shear plate is employed. In the preferred arrangements the reel rotates in a direction such that the lower blades move in the forward direction with respect to the normal direction of travel of the mower, and the outer edges of the blades are forwardly hooked.

In mower operation air is drawn into the blower from in front of the mower and draws the grass toward the forwardly moving lower blades so that the grass is cut effectively. The grass clippings are discharged from the outlet of the blower and may be directed toward the ground, discharged to the side, or collected in a grass catcher.

In a cross-flow blower air is drawn into the rotor at the inlet region, passes through the interior of the rotor, and then passes out of the rotor at the outlet region. Thus the air passes through the blades twice in a direction transverse to the rotor axis. Vortex components around the blades are involved in the functioning of the blower.

In my U.S. Pat. No. 3,818,684 certain improvements are described including a forward extension on the housing which causes an auxiliary vortex to be developed.

In my application Ser. No. 741,132, supra, improvements are described for reducing blower noise while preserving good mowing performance, and even enabling enhanced performance. In the specific embodiments of FIGS. 1-3 other features are described in order to illustrate a preferred mower construction. Novel blade structures are described and the term "rotor" is employed. The term "rotor" is used herein to include such structures as well as the structures of U.S. Pat. No. 3,673,773, etc.

In order to cut grass cleanly, with minimum fraying, the cutting edges of the blades should be reasonably sharp. This is also true of conventional types of mowers such as rotary mowers and reel mowers with bed knives or shear plates. Some dulling of the blades may be acceptable, and is commonly tolerated in practice due to the trouble and/or expense involved in keeping the blades sharp. Nevertheless, sharp blades are desirable for best performance.

Various types of sharpeners have been suggested, particularly for conventional reel mowers. Some are attachments which must be manually mounted on the mowers. Others are mounted on the mower and manually moved into sharpening position. Both types require manipulation by the user, and some degree of care and attention, and widespread use has not been attained. In the case of rotary mowers, it is common to remove the blades from the machine for sharpening, or to employ special grinding wheels in a power tool.

In my U.S. Pat. No. 3,659,385, a sharpening attachment is described for mowers of the cross-flow type. Since this also requires manipulation, a user may not go to the trouble of keeping the blades sharp, even if the attachment is provided.

SUMMARY OF THE INVENTION

The mower of the present invention includes a sharpener which automatically sharpens the blades each time the clutch between motor and rotor is disengaged, and at the same time serves to brake the rotor. Accordingly, the term "brake/sharpener" is used. To this end, one of the wall sections of the blower conduit extending laterally along the length of the rotor has an abrasive panel facing the rotor, and the abrasive panel is mounted for movement between a mowing position in which the panel is spaced from the rotor and a brake/sharpener position in which the panel is contacted by the blades. Means are provided for automatically moving the abrasive panel to its brake/sharpener position when the clutch is disengaged, and to its spaced mowing position when the clutch is engaged.

Accordingly, each time the operator disengages the clutch, the blades are sharpened by the abrasive panel and the abrasive panel slows the rotation of the rotor to a halt.

The brake/sharpener may be used with either direction of rotation of the rotor. However, as stated above, in the preferred arrangements the direction of rotation is such that the lower blades move in the normally forward direction of travel of the mower. In such case the blower conduit has upper and lower wall sections extending laterally along the length of the reel, and respective portions of the wall sections are close to the rotor at circumferentially spaced positions separating inlet and outlet regions of the blower. The abrasive panel may be located on the upper or lower wall section, advantageously the upper wall section.

The wall section carrying the abrasive panel may be pivotally mounted in the sides of the housing and moved to either of its two positions by an eccentric rod extending laterally of the mower. To avoid excessive rattle during mowing, however, the upper edge of the wall section carrying the abrasive panel may be resiliently attached to the adjacent portion of the blower conduit and arranged with sufficient flexibility to allow deflection of the abrasive panel to and away from the rotor blades.

DESCRIPTION OF THE SPECIFIC EMBODIMENTS

Figure 1:
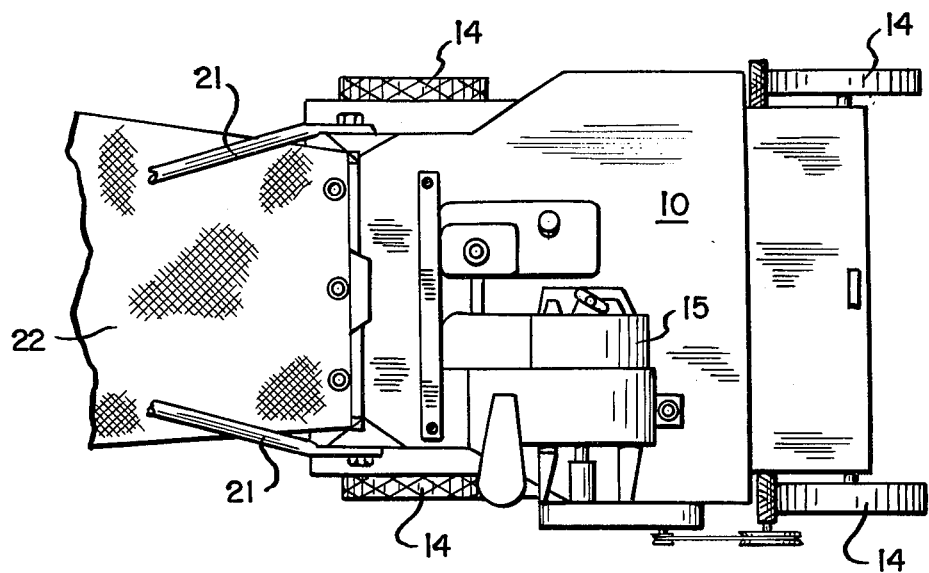
FIG. 1 is a top view of a mower in which the present invention is used.
Figure 2:
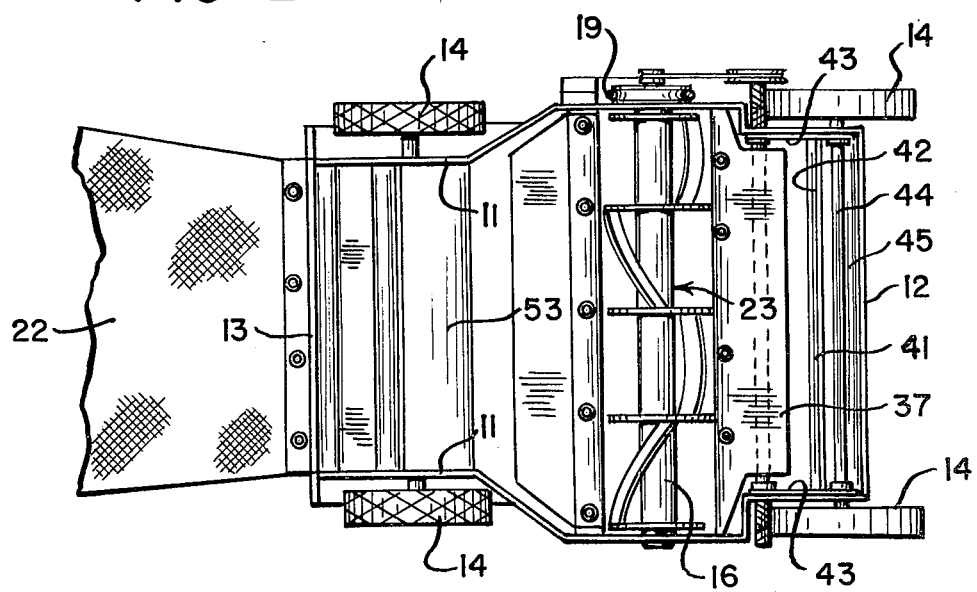
FIG. 2 is a bottom view of the mower.

Referring to FIGS. 1 and 2, the mower carriage includes a top 10, sides 11, front and rear frame members 12, 13 and wheels 14. Motor 15 is mounted on top 10 and drives the axle 16 of the rotor through a belt 17 (FIG. 3) and pulleys 18, 19. Front wheel drive is provided, but need not be described. A handle 21 is attached to the carriage in desired manner, and a bag 22 for receiving cut grass may be removably attached.

The rotor is generally designated as 23 and has a blower conduit cooperating therewith to form a cross-flow blower. The rotor may be one of those shown in application Ser. No. 741,132, or one of those shown in U.S. Pat. No. 3,673,773, or other suitable types. The blower conduit is shown in cross-section in FIG. 3.

Figure 3:
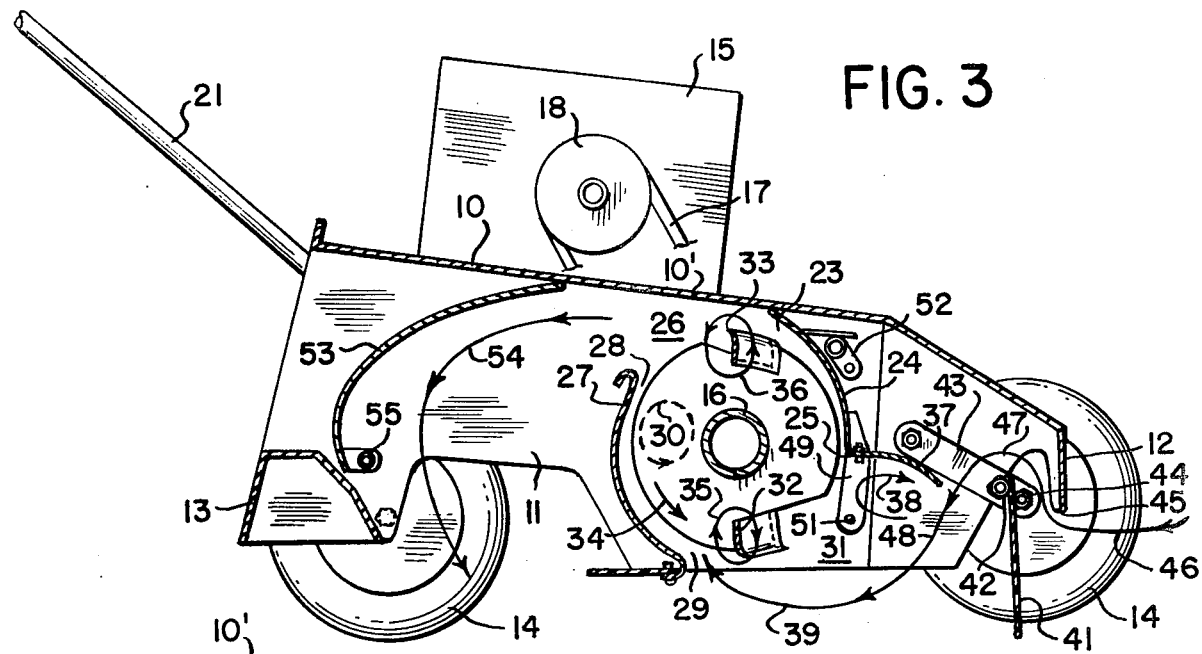
FIG. 3 is a vertical section through the mower.

Referring to FIG. 3, the blower conduit comprises an upper wall section including a transversely extending sheet member 24 merging with a portion 10' of the top 10. Member 24 is close to the rotor at 25 and the separation from the rotor gradually increases toward the rear outlet region 26 of the blower. A lower wall section of the blower conduit is formed by a transversely extending sheet member 27. This also is close to the rotor, particularly at 28 and 29. In between 28 and 29 the member 27 may be curved away from the rotor to promote air flow into the rotor from the inlet region 31. This feature will not be described further herein, since it is not necessary for an understanding of the present invention.

Blades 32 and 33 of the rotor are approximately helical, and are here shown with forwardly extending outer hooks of the type described in the above-identified patents. This type is preferred, and the rotor is driven in the direction indicated by arrow 34 with the blades in their lower positions moving forwardly in the forward direction of travel of the mower. As the blades move, vortex components are produced therearound which are in one direction of rotation in the inlet region as shown by arrow 35, and in the opposite direction in the outlet region as shown by arrow 36.

The action of a cross-flow blower is commonly explained in terms of a vortex representing an actual eddy or whirlpool of air at or near the region where the blades pass from the outlet to the inlet regions. It is believed that such a vortex exists at or near the region 30. However the actual configuration is difficult to determine and hence dash lines are employed. Although this may explain the overall functioning as a blower, for lawn mowing purposes it is believed that the presence of vortex components around the blades is more significant. The vortex action results in air being drawn into the inlet region, passing through the open rotor structure, and then to the outlet region. A curved front extension 37 in the upper wall of the blower conduit promotes the formation of an auxiliary vortex 38 as described in U.S. Pat. No. 3,818,684, supra.

Overall, a major portion of the air flow in the inlet region 31 is at the lower portion thereof, as indicated by arrow 39, so that there is a substantial component of velocity tangential to the rotor, and opposite to the direction of movement of the blades. Thus grass to be cut is forced against the blades, thereby promoting effective mowing. Further details of the air flow are given in the above-identified patents.

Inasmuch as the vortex components 35, 36 around the blades reverse in passing from the inlet to the outlet region, the portion of upper plate 24 adjacent the inlet region may be termed the front vortex breaker, for convenience. Similarly, inasmuch as the vortices reverse as the blades pass from the outlet region to the inlet region, the lower plate 27 may be termed the rear vortex breaker.

In the embodiment shown in FIGS. 1-3, a sheet 41 of tough flexible material such as ethylene vinyl acetate (EVA) is placed across the front of the mower in position to intercept any object which may be hit by the blades and thrown forward. The top of the sheet is advantageously attached to a cross bar 42 extending between the links 43 on the ends of which axle 44 for the wheels is mounted. Thus, as the height of the mower is adjusted, the lower end of sheet 41 remains close to the ground, thereby providing practically complete protection against thrown objects.

In order to supply sufficient air to the blower despite the blocking action of sheet 41, a space is provided between the sheet and the forward lip 45 of the housing. Thus air from in front of the mower, indicated at 46, flows over the top of sheet 41, cross bar 42 and axle 44, as indicated at 47, and then downward as indicated at 48.

Sheet member 24 is here shown as attached to an arm 49 which is pivoted at 51 to one side of the housing, and to a similar arm at the other side. The underside of the sheet member 24 is provided with abrasive material and the member is pressed against the rotor blades by a cam arm 52 each time the rotor is declutched from the driving motor, thereby sharpening the blades and also braking the rotor.

In the outlet region, curved plate 53 directes the flow of air toward the ground, together with cut grass carried thereby, as indicated by arrow 54. Plate 53 is pivoted to the sides of the housing, as indicated at 55, and may be moved downward when bagging is desired.

Figure 4:
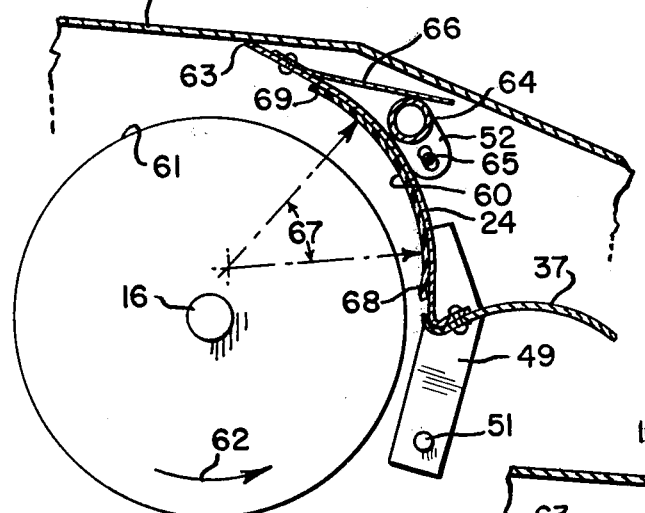
FIGS. 4 and 5 are detail views of one embodiment of the brake/sharpener in mowing and brake/sharpening positions respectively.
Figure 5:
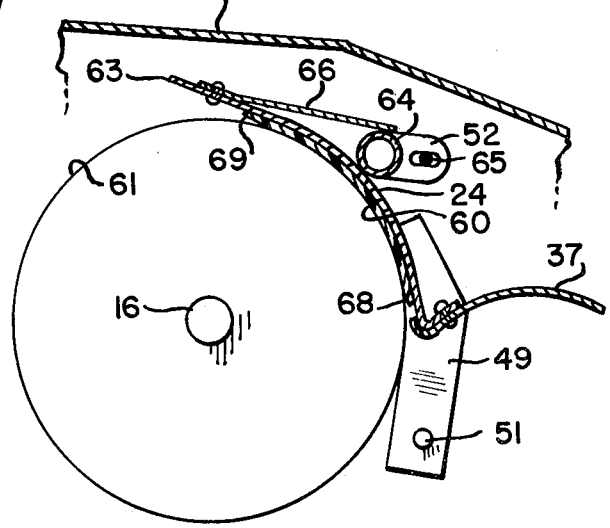

Considering now the brake/sharpener in more detail, FIGS. 4 and 5 show the mechanism of FIG. 3 on an enlarged scale, and in respective mowing and brake/sharpening positions.

Sheet member 24, forming a section of the upper wall of the blower conduit, has an abrasive panel 60 facing the rotor. The abrasive panel may be cemented to plate 24, or otherwise affixed therewith. The abrasive panel and sheet member extend transversely of the mower along the entire length of the rotor. Circle 61 indicates the path of travel of the outer edges of the blades which are to be kept sharp. The direction is indicated by arrow 62. In the mowing position of FIG. 4, member 24 and abrasive panel 60 are spaced from the rotor in proper position to form the front vortex breaker. The upper edge 63 of member 24 is in contact with portion 10' of the top of the mower which forms a continuation of the blower conduit.

A tubular rod 64 extends transversely of the mower and is eccentrically mounted by arm 52 pivoted at 65 to one side of the mower housing, and by a similar arm pivoted to the other side of the housing. A plurality of spring tabs or wires, one of which is shown at 66, are attached to member 24 and spaced transversely of the mower in contact with eccentrically mounted rod 64. In the position of FIG. 4, the spring 66 urges the upper edge 63 into contact with top section 10', and allows some overtravel of rod 64 clockwise to avoid criticalness of adjustment.

In FIG. 5, eccentrically mounted rod 64 has been turned counterclockwise about pivot point 65 to press against member 24 and cause the member to turn about pivot point 51 to press the abrasive panel 60 against the outer edges of the rotor blades moving in circular path 61. The central section of the abrasive panel has the same radius of curvature as the rotor, as indicated at 67 in FIG. 4, so as to provide a substantial sharpening and braking area. The lower edge 68 of the abrasive panel is flatter so that the blade edges do not gouge the panel. The upper edge 69 may also be flatter to conform to a desired gradually increasing separation of the front vortex breaker from the rotor.

With approximately helical blades, the edge of a given blade engages the abrasive panel gradually along the length of the blade, and each point engages the panel for a substantial circumferential distance. The circumferential dimension of the abrasive panel is selected with respect to the helix angles and the blade lengths so that a succeeding blade at some point along the rotor engages the panel before a preceding blade leaves the panel. That is, in the brake/sharpening position a portion of at least one blade is always in contact with the abrasive panel as the rotor rotates. This maintains the panel in proper sharpening position with respect to the path of travel of the blade tips illustrated by circle 61, without bouncing.

Figure 6:
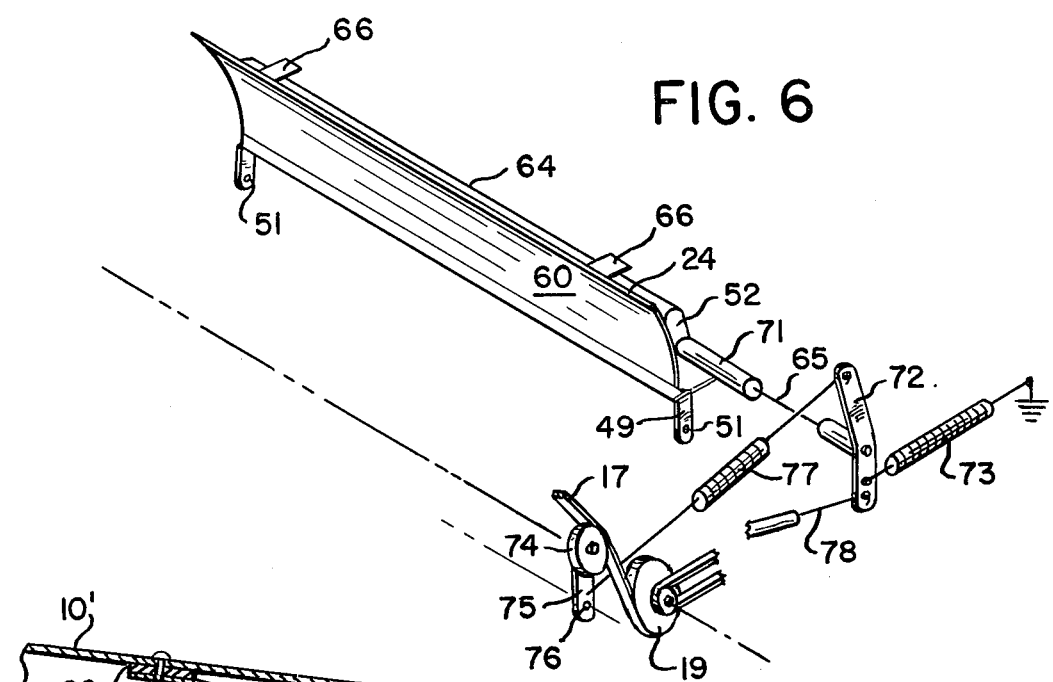
FIG. 6 is a schematic showing suitable actuating mechanism for the brake/sharpener of FIGS. 4 and 5.

FIG. 6 illustrates suitable mechanism for actuating the brake/sharpener. A stub shaft 71 extends through the side plate (not shown) of the mower housing and is attached to arm 52 so that the rod 64 rotates eccentrically about axis 65. A lever 72 is attached to stub shaft 71. Tension spring 73 yieldingly biases shaft 71 and eccentric rod 64 counterclockwise as viewed from the right end, and hence yieldingly biases abrasive panel 60 to its brake/sharpening position. Lever 72 also actuates clutch means comprising idler 74, belt 17 and the associated pulleys for engaging motor 15 (FIG. 3) with rotor 23, and disengaging the motor. FIG. 6 shows belt 17 in partial view. An idler 74 is carried by arm 75 pivoted at 76 to the mower housing. Spring 77 connects arm 75 with lever 72. Lever 72 is actuable by a cable 78 connected to a suitably located lever, such as a so-called deadman's control.

When cable 78 is tightened by the user, lever 74 is turned clockwise and, through spring 77, the idler 74 is pulled against belt 17 to tighten the belt around pulley 19 on the rotor axle. Accordingly, the motor drives the rotor. At the same time, the turning of lever 72 moves eccentric rod 64 away from the rotor, and, through springs 66, moves the brake/sharpener away from the rotor to its mowing position shown in FIG. 4. When cable 78 is loosened, spring 73 turns lever 72 counterclockwise, thus loosening idler 74 and belt 17 to disengage the motor from the rotor pulley 19, and at the same time moving plate 24 and abrasive panel 60 to its brake/sharpening position shown in FIG. 5.

As will be understood, each time the operator releases cable 78, the blades are sharpened and the rotor braked. If the number of actuations during normal use do not keep the blades sufficiently sharp, or portions of the blades are dulled by contact with debris, the clutch may be engaged and disengaged a number of times in succesion to repeat the sharpening operation.

Figure 7:
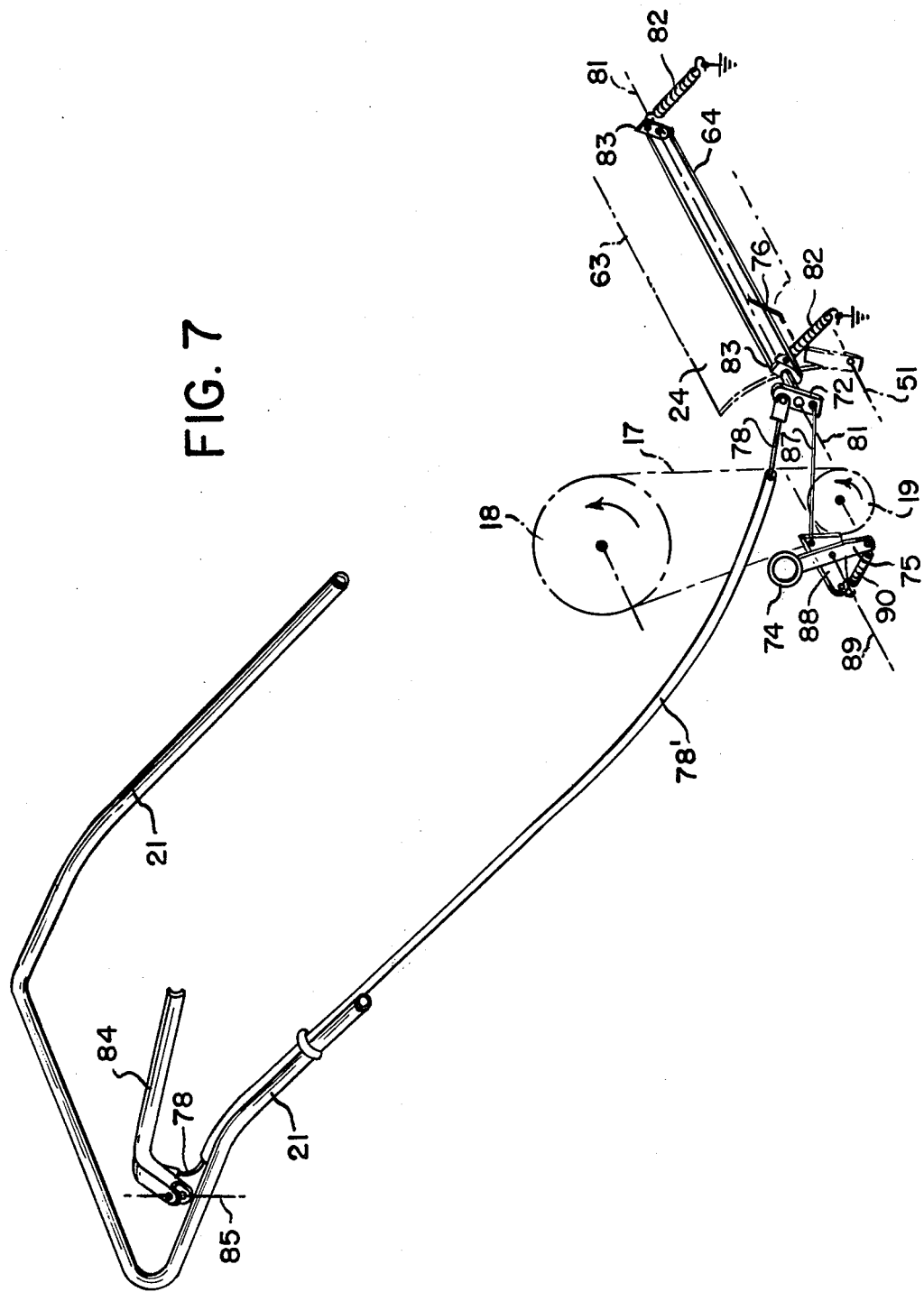
FIG. 7 is a schematic showing another embodiment of actuating mechanism for the brake/sharpener.

FIG. 7 shows another embodiment of mechanism for actuating the brake/sharpener of FIGS. 4 and 5. Here, however, the eccentrically mounted rod 64 is mounted to pivot around an axis 81 which is above the rod so that the turning directions are interchanged. That is, clockwise rotation as viewed from the left engages the brake/sharpener with the rotor and counterclockwise rotation releases it.

Tension springs 82 are attached to short lever arms affixed to the ends of rod 64 to resiliently bias the rod clockwise, thus pressing the rod against plate 24 to engage the brake/sharpener with the rotor blades. Lever arm 72 is affixed with the eccentrically mounted rod 64 as before, and the wire core 78 of an actuating cable is attached to one end of lever arm 72. The cable sheath 78' is attached to handle 21 of the mower, and the upper end of the wire core 78 is attached to a deadman's control arm 84 which is pivoted on the handle as shown by line 85. When the control arm 84 is pulled against the top of handle 21, wire core 78 is tightened and turns lever arm 72 counterclockwise. This moves eccentric rod 64 back from plate 24, and spring fingers attached to plate 24 and engaging rod 64 (one of which is shown at 76) moves plate 24 away from the rotor to its mowing position as shown in FIG. 4.

A rigid rod 87 connects the other end of lever arm 72 with an idler actuating plate 88. Plate 88 and idler arm 75 are pivoted about axis 89, and are interconnected by spring 90. When wire core 78 is tightened, rod 87 rotates plate 88 clockwise and, through spring 90, rotates idler arm 75 clockwise to press idler wheel 74 against belt 17. Thus the belt is tightened around pulleys 18 and 19 and the motor drives the rotor. When control lever 84 is released, springs 82 cause lever arm 72 to turn clockwise, thus turning plate 88 counterclockwise and relieving the tension on idler arm 75 and thereby the tension of belt 17. Accordingly, the motor is disengaged from the rotor, and the brake/sharpener stops the rotor and at the same time sharpens the blades.

This design allows substantial overtravel of eccentric rod 64 and actuating plate 88 to eliminate critical adjustments. When wire core 78 is tightened to disengage the brake/sharpener from the rotor, the upper edge 63 of plate 24 engages the top of the mower as seen in FIG. 4. Further movement of eccentric rod 64 is allowed by finger springs 76. Overtravel of plate 88 is allowed by spring 90 without excessively increasing the force of idler wheel 74 on belt 17. To keep the force within desired limits, spring 90 is attached to plate 88 and idler arm 75 so that, as the spring elongates, it moves closer to pivot axis 89. Thus the angle at which spring 90 pulls on arm 75 decreases and the resultant rotating force on arm 75 increases very slowly.

In some cases, such as with the rotors of Ser. No. 741,132 having two blades per section, air pulsations may cause the brake/sharpener of FIGS. 4 and 5 to rattle during mowing. This may occur at point 63, and at the pivot points which may wear during use. The embodiment of FIGS. 8 and 9 is designed to eliminate any such rattling.

Figure 8:
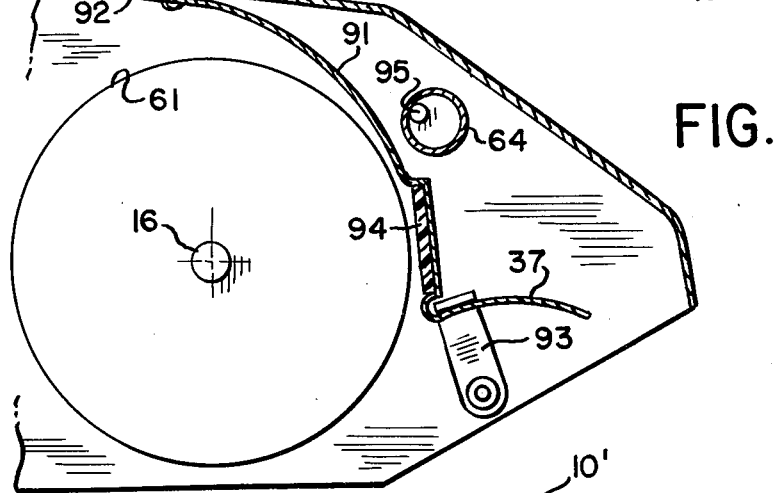
FIGS. 8 and 9 are detail views of another embodiment of the brake/sharpener in mowing and brake/sharpening positions respectively.
Figure 9:
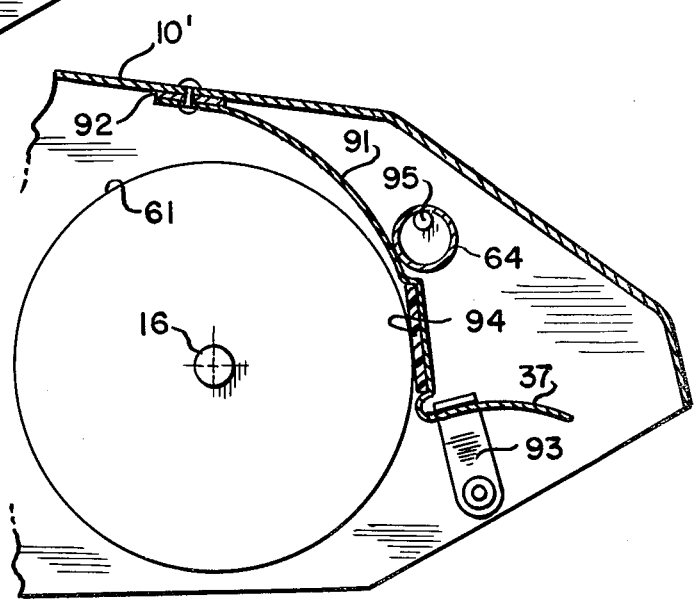

Referring to FIGS. 8 and 9, sheet section 91, forming the front vortex breaker, is fastened along its trailing edge to the housing with interposed rubber washers 92 and rivets, bolts, etc. The leading edge is secured, as by welding, to struts attached to the sides of the housing, one of which is shown at 93. The struts are also attached to the housing with rubber washers or grommets. Extension 37 for the auxiliary vortex in front of the rotor may be provided. The section 91 is channeled to receive the abrasive panel 94 which extends transversely along the length of the rotor. Eccentric rod 64 is pivoted at 95.

FIG. 8 shows the brake/sharpener in mowing position, with section 91 and abrasive panel 94 spaced from the rotor. In FIG. 9, eccentric rod 64 has been turned clockwise to press abrasive panel 94 against the blade edges of the rotor, the resiliency of the rubber washers 92 and that of sheet section 91 allowing sufficient movement. When rod 64 is subsequently turned counterclockwise, the resiliency returns section 91 and panel 94 to the position of FIG. 8.

In the mowing position, preferably the eccentric rod 64 is out of contact with sheet section 91, as illustrated in FIG. 8. This, together with the attachment of the leading and trailing edges to the housing, and a small spacing of the side edges of section 91 from the sides of the housing, eliminates objectionable rattle during mowing.

The actuating mechanism of FIG. 7 may be used to control the rotation of rod 64 of the brake/sharpener of FIGS. 8 and 9.

Other arrangements are possible for mounting the vortex breaker and associated abrasive panel and moving them toward and away from the rotor. For example, instead of attaching the leading edge of plate 91 to struts 93, a transverse tube could be welded at the junction of the leading edge and the auxiliary vortex forming section 37. A rod with cam washers spaced therealong could then be inserted in the tube and the rod turned to move the abrasive panel toward and away from the rotor, the resilience of plate 91 and rubber washers 92 allowing sufficient movement.

In sharpening, some sparks will commonly be generated. With the abrasive panel on the front vortex breaker, as in the specific embodiments described, the sparks will be dissipated inside the housing. This is facilitated by the decrease in blower action when the front vortex breaker contacts the rotor. With this arrangement, the rear vortex breaker may be designed without regard to brake/sharpening considerations, and visible hot sparks avoided. However, if desired, the rear vortex breaker could be designed as a brake/sharpener and arranged to move toward and away from the rotor.

Sheet metal construction has been shown in the specific embodiments. However, plastics may be employed if desired.

I claim:

1. A mower of the cross-flow blower type comprising
  (a) a carriage,
  (b) a cylindrical rotor mounted on said carriage with the axis thereof substantially horizontal and extending laterally of the carriage,
  (c) said rotor having one or more sections along the axis thereof with a plurality of circumferentially-spaced approximately helical fixed blades in each section moving in the same path of travel and spaced from the rotor axis to leave the major portion of the interior of the rotor free for air flow through the rotor transversely thereof,
  (d) motor means for driving said rotor,
  (e) the outer leading edges of the blades being sharp to form cutting edges and the cross-section of the blades having at least a portion on the leading side thereof which slopes backwardly and inwardly with respect to the direction of rotation of the rotor,
  (f) a blower conduit cooperating with said rotor to form therewith a cross-flow blower,
  (g) said conduit comprising two wall sections extending laterally along the length of the rotor and having respective portions close to the rotor at circumferentially spaced positions separating inlet and outlet regions of the blower,
  (h) said inlet region opening downwardly and forwardly with a portion of the rotor therein exposed to material to be mowed,
  (i) the portions of the mower adjacent the rotor being non-shearingly spaced from the path of travel of said blades during mowing operation,
  (j) clutch means for engaging said motor means with said rotor and disengaging the motor means therefrom,
  (k) one of said wall sections of the conduit having an abrasive panel facing said rotor,
  (l) means mounting said abrasive panel for movement between a mowing position in which the panel is spaced from the rotor and a brake/sharpening position in which the panel is contacted by the rotor blades,
  (m) and means for automatically moving said abrasive panel to said brake/sharpening position when said clutch means is disengaged and to said mowing position when the clutch means is engaged.

2. A mower according to claim 1 in which said abrasive panel forms at least a part of one of said portions of the wall sections close to the rotor.

3. A mower of the cross-flow blower type comprising
  (a) a carriage,
  (b) a cylindrical rotor mounted on said carriage with the axis thereof substantially horizontal and extending laterally of the carriage,
  (c) said rotor having one or more sections along the axis thereof with a plurality of circumferentially-spaced approximately helical fixed blades in each section moving in the same path of travel and spaced from the rotor axis to leave the major portion of the interior of the rotor free for air flow through the rotor transversely thereof,
  (d) motor means for driving said rotor in a rotational direction such that the lower blades move in the normally forward direction of travel of the mower,
  (e) the outer leading edges of the blades being sharp to form cutting edges and the cross-section of the blades having at least a portion on the leading side thereof which slopes backwardly and inwardly with respect to the direction of rotation of the rotor,
  (f) a blower conduit cooperating with said rotor to form therewith a cross-flow blower,
  (g) said conduit comprising upper and lower wall sections extending laterally along the length of the rotor and having respective portions close to the rotor at circumferentially spaced positions separating inlet and outlet regions of the blower,
  (h) said inlet region opening downwardly and forwardly with a portion of the rotor therein exposed to material to be moved,
  (i) the portions of the mower adjacent the rotor being non-shearingly spaced from the path of travel of said blades during mowing operation,
  (j) clutch means for engaging said motor means with said rotor and disengaging the motor means therefrom,
  (k) one of said upper and lower wall sections having an abrasive panel facing the rotor,
  (l) means mounting said one wall section for movement between a mowing position in which the abrasive panel is spaced from the rotor and a brake/sharpening position in which the panel is contacted by the rotor blades, (m) and means for automatically moving said abrasive panel to said brake/sharpening position when said clutch means is disengaged and to said mowing position when the clutch means is engaged.

4. A mower according to claim 3 in which said abrasive panel forms at least a part of the portion of the upper wall section which is close to the rotor.

5. A mower according to claim 4 in which said means for moving the abrasive panel includes an eccentrically mounted rod extending laterally of the mower, lever means for turning the rod toward said one wall section and away therefrom, and means for yieldingly biasing said rod toward said one wall section.

6. A mower according to claim 4 in which the trailing edge of said upper wall section is resiliently attached to the adjacent portion of the blower conduit.

* * * * *